(12) United States Patent
Espinda

(10) Patent No.: US 6,928,957 B2
(45) Date of Patent: Aug. 16, 2005

(54) BIRD SEED COLLECTOR

(76) Inventor: Douglas Espinda, 917 N. Union St., Kennewick, WA (US) 99336

( * ) Notice: Subject to any disclaimer, the term of this patent is extended or adjusted under 35 U.S.C. 154(b) by 0 days.

(21) Appl. No.: 10/702,687

(22) Filed: Nov. 5, 2003

(65) Prior Publication Data

US 2005/0103278 A1    May 19, 2005

(51) Int. Cl.⁷ .............................................. A01K 5/00
(52) U.S. Cl. ...................................... 119/467; 119/469
(58) Field of Search ........................ 119/467, 469, 429, 119/430, 431, 432, 463, 57.8, 65, 68, 69

(56) References Cited

U.S. PATENT DOCUMENTS

| | | | | |
|---|---|---|---|---|
| 363,879 A | * | 5/1887 | Armstrong | .................. 119/469 |
| 1,094,423 A | * | 4/1914 | Brandt | ....................... 119/469 |
| 2,028,612 A | * | 1/1936 | Kosvich | ..................... 119/469 |
| 2,045,472 A | * | 6/1936 | Kearney et al. | ............ 119/469 |
| 5,088,445 A | * | 2/1992 | Brindamour | ................ 119/469 |
| 5,771,838 A | | 6/1998 | Bloom et al. | .............. 119/52.2 |
| 6,390,021 B1 | | 5/2002 | Krenzel | ..................... 119/52.2 |
| 6,394,034 B2 | * | 5/2002 | Watts | ......................... 119/469 |
| 6,405,673 B1 | | 6/2002 | Allender | .................... 119/52.1 |
| 6,532,896 B1 | * | 3/2003 | Hurlbert | .................... 119/57.8 |

* cited by examiner

*Primary Examiner*—Yvonne R. Abbott
(74) *Attorney, Agent, or Firm*—Floyd E. Ivey; Liebler, Ivey, Connor, Berry & St. Hilaire

(57) ABSTRACT

This invention is a bird seed collector providing a suspended reservoir beneath a wild bird feeder.

20 Claims, 3 Drawing Sheets

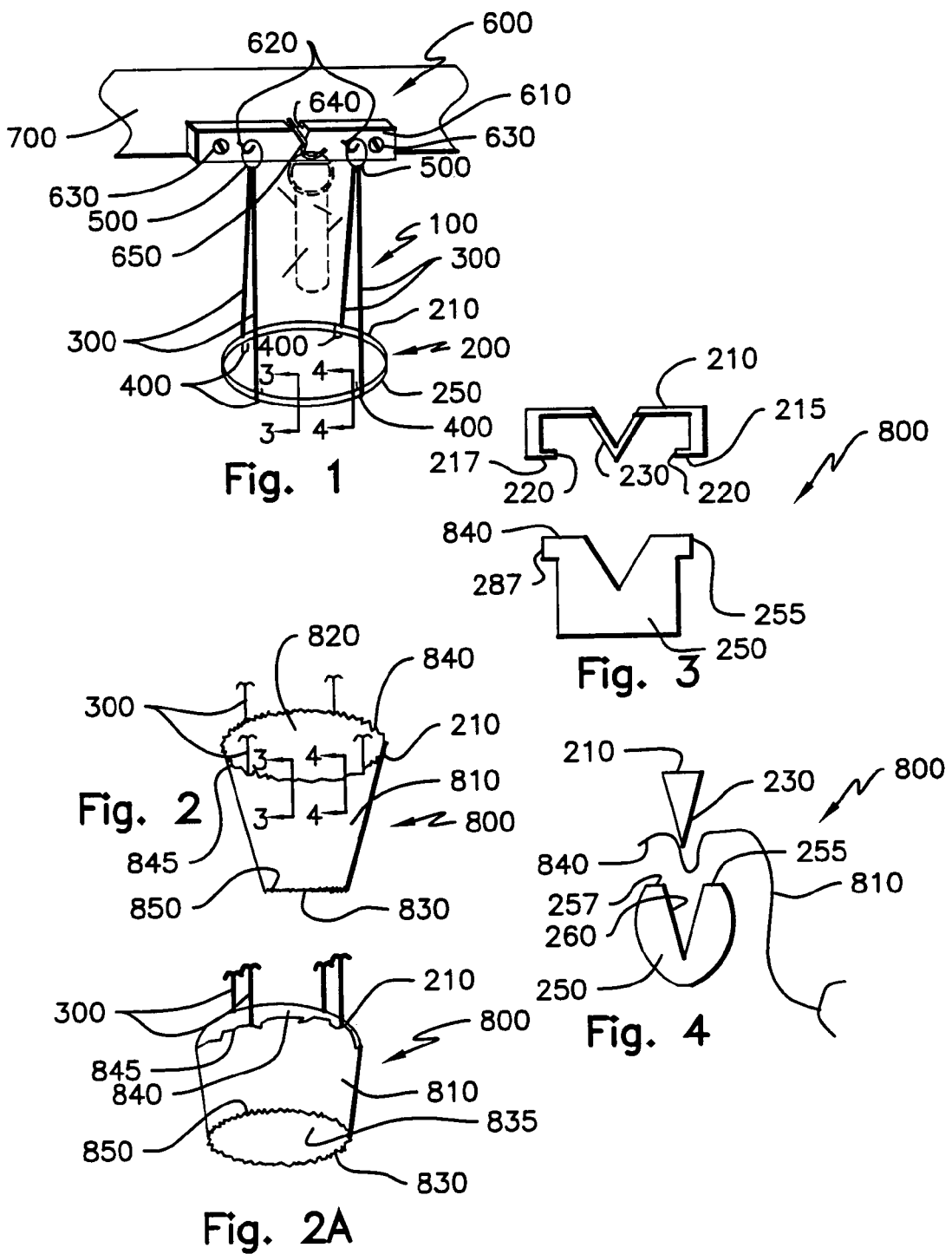

BIRD SEED COLLECTOR

FIELD OF THE INVENTION

This invention relates to the collection of bird seeds dispensed from a wild bird feeder.

BACKGROUND OF THE INVENTION

Birds feeding at wild bird feeders dispense seeds and hulls beneath the feeder. Bird seed collectors in the prior art complex in construction, require particular bird feeder structure for suspension, pose difficulties for cleaning and comprise obstacles to the removal of a bird feeder for refilling. The prior are includes U.S. Patents as follows: U.S. Pat. No. 6,405,673 to Allender; U.S. Pat. No. 6,390,021 to Krenzel and U.S. Pat. No. 5,771,838 to Bloom et. al. The patents referred to herein are provided herewith in an Information Disclosure Statement in accordance with 37 CFR 1.97.

SUMMARY OF THE INVENTION

The bird seed collector comprises a reservoir suspended beneath and independent of a bird feeder. The reservoir is comprised of pliable material means generally including fabric and plastics with the reservoir comprising generally a bag. The reservoir material means is held in place by a friction fit or a combination friction fit and locking two part frame. The frame is suspended by cable and hook means from a suspension means positioned generally above the bird feeder. The suspension means distinguishes this invention from prior art in that the manner of suspension means does not interfere with the removal of a bird feeder for refilling purposes in that the bird seed collector is not connected to the bird feeder. The reservoir or bag has an open top at the frame and is closed, by closing means at the bottom, distal from the frame. The reservoir is easily removed for cleaning by laundry or other washing means. The reservoir does not depend on any bird feeder structure for suspension. The bird feeder itself is not impeded in removal for refilling. The reservoir suspension means is positioned away from the bird feeder and does not block birds flight to or from the bird feeder. The invention is easily employed by the user. There are no interconnections with the bird feeder which may damage the bird feeder. The reservoir, comprised primarily of a bag, is easily replaced and may be formed from a variety of stylish materials. The invention may be manufactured in a variety of shapes and sizes to satisfy the desires of the consumer and to interface with the many differently sized and shaped bird feeders.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein:

FIG. 1 is a perspective view of the bird seed collector showing the frame system (100), frame (200), cable means (300) and suspension means (600).

FIG. 2 illustrates the reservoir (800) with bag (810), bag top opening (820), bag bottom (830), bag top (840) and bag bottom closing means (850).

FIG. 2A illustrates the reservoir (800) with the bag bottom closing means (850) open.

FIGS. 3 and 4 are sections from FIG. 1 showing alternative embodiments of the two part frame (200) with top frame member (210) and bottom frame member (250) depicting the bag (810) impinged between the top frame member (210) and the bottom frame member (250).frame top mat the bat top (840).

DETAILED DESCRIPTION

Figure 5:
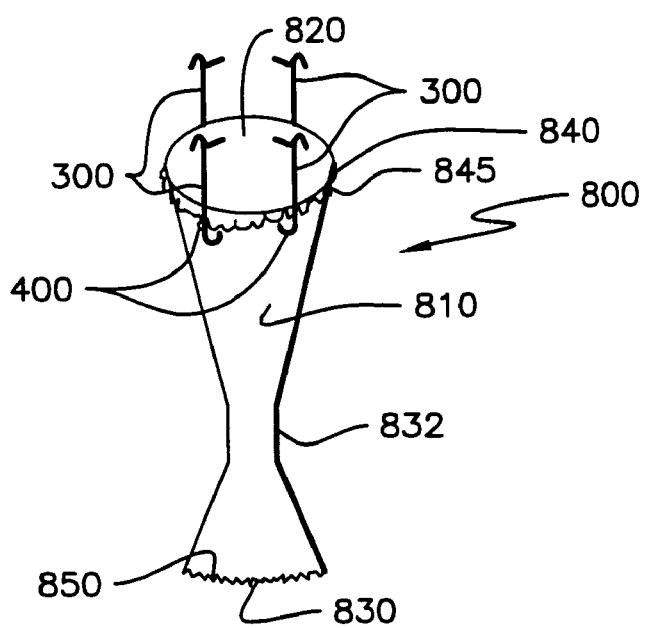
FIG. 5 illustrates a bag (810) having an annulus (832) intermediate the bag top(840) and the bag bottom (830).

FIGS. 1 through 9 depicts bird seed collector. Depicted is a frame (200) securing and supporting a bag (810), both of which are suspended from a suspension means (600) via cable, hook and hoop means (300, 400, 500).

The frame system (100) comprises a two part frame (200). Two embodiments of the two part frame (200) are depicted in FIGS. 3 and 4. The embodiment of the two part frame (200) in both FIG. 3 and FIG. 4 illustrates a top frame member (210) having a wedge means (230) comprised, in these embodiments of a top frame wedge means (230). The top frame wedge means (230) is comprised, in these embodiments, of a downward directed wedge means comprised in the preferred embodiments of a "V" or "U" wedge but which will include other downward directed shapes comprising generally other geometric cross-sections. A bottom frame member (250) has a wedge receiving means (260) which is sized and shaped to receive the wedge means (230). In the preferred embodiment the "V" or "U" shaped wedge means (230) which will be received into a "V" or "U" shaped bottom frame wedge receiving means (260), generally a groove as indicated in FIG. 3, which is sized to receive the top frame wedge means (230). When a bag (810), proximal a bag top (840) and proximal a bag top perimeter (845) is placed between the indicated top frame member (210) and the bottom frame member (250) the pliable or flexible bag top (840) will be depressed, by the top frame wedge (230), into the bottom frame wedge receiving means (260) effecting a friction securing means between the bag (810) and the two part frame (200).

The two part frame (200) of FIG. 3 further demonstrates securing the bag (810) with the frame (200) via a clamping means provided by the top frame first clamp means (215) and the top frame second claim means (217). In this embodiment each of the top frame first clamp means (215) and the top frame second claim means (217) extend outward from the top frame wedge means (230). The top frame first clamp means (215) has a top frame clamp means first end (220) which is distal from the top frame wedge means (230) and which forms a clamping means generally cup or hook shaped toward the top frame wedge means (230). The top frame second clamp means (217) has a top frame clamp means second end (222) which is distal from the top frame wedge means (230) and which forms a clamping means generally cup or hook shaped toward the top frame wedge means (230). The top frame first clamp means (215) and the top frame second clamp means (217) are formed from spring or elastic means materials such as plastics and some metals. The spring component is such that the top frame clamp means first end (220) and the top frame clamp means second end (222) may be urged out and up or bowed out and up from the top frame wedge means (230) and, when forced downward against the bottom frame member (250) and released, the spring function will urge the receipt respectively by the bottom frame first clamp means (255) and bottom frame second clamp means (257). The embodiment of FIG. 3 illustrates a female to male interconnection between the indicated top frame first clamp means (215) and the top frame second clamp means (217) with the bottom frame first clamp means (255) and bottom frame second clamp means (257). This embodiment illustrates securing means of the bag (810) between the top frame member (210) and the bottom frame member (250) via both friction and clamping forces.

A reservoir (800) comprises a bag (810) having a bag top opening (820), a bag bottom (830), a bag top (840), a bag top perimeter (845), a bag bottom opening (835) and a bag bottom closing means (850). The reservoir (800) is generally formed from a flexible and pliable material including cloth, vinyl and plastics. The bag bottom closing means (850) includes zipper, Velcro®, and similar means of closing the bottom of a bag. The bag top (840) is distal to the bag bottom (830). The a bag top (840) at the bag top opening (820) comprises the bag top perimeter (845). The two part frame (200) receives the bag top (840) such that the bag top perimeter (845) is fully grasped between the top frame member (210) and the bottom frame member (250). The bag bottom opening (820) is closed or secured by the bag bottom closing means (850). When the closing means (850) is released the bag bottom opening (835) is revealed.

In an alternative embodiment, shown in FIG. 5, a bag annulus (832) is intermediate the bat top (840) and the bag bottom (830). In this embodiment the bag (810) narrows from the bag top (840) to the bag annulus (832) and the bag (810) generally enlarges from the bag annulus to the bag bottom (830). This bag (810) from the bag annulus (832) to the bag bottom (830) collects the seeds and is less susceptible to wind and other weather elements which might dislodge the collected seeds from the bag (810) and disburse them over the yard, garden or patio. In this embodiment the bag annulus (832) is preferred with a annulus diameter of 3" with the bag (810) at the bag bottom (830) generally 10" in diameter or the bag bottom closing means (850) will measure approximately 10".

Figure 6:
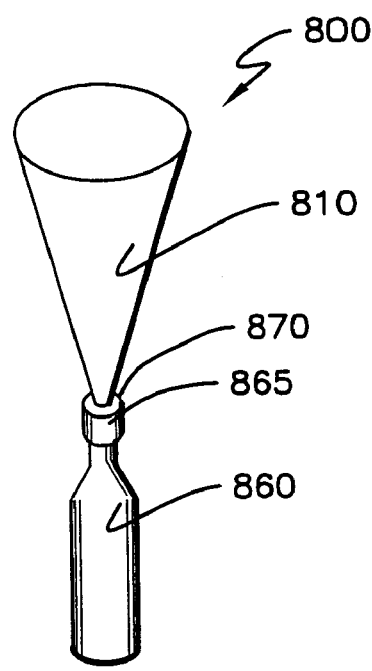
FIG. 6 shows an alternative embodiment wherein a bag (810) at the bag bottom (830) discharges collected bird seed in a bottle (860).
Figure 7:
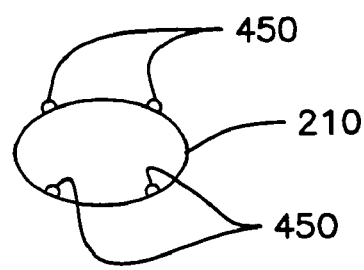
FIG. 7 shows a top frame member (210) having integral eyelet means (450).

An additional alternative embodiment, shown in FIG. 6, illustrates a reservoir (800) having a bag (810) interconnected with a bottle (860) with a threaded PVC joint (865). The threaded PVC joint (865) having a threaded interconnection with the bottle (860) and offering joint (865) opening which receives the bag (810) at the bag bottom (830) for interconnection between bag bottom (830) and joint (865) generally by glue means (870) such as hot glue. Those of ordinary experience with material interconnection arts will see that other means is available and will be the equivalent.

Figure 8:
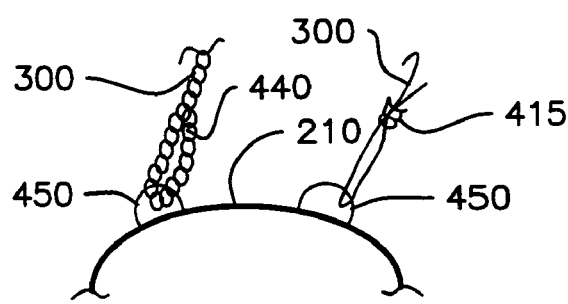
FIG. 8 illustrates use of a chain (300) with a clip hook (410) where the clip hook (410) permits adjustment of the length of the chain (300) from the suspension means (600); also illustrated is a cord or cable (300) with a buckle (415) permitting cord or cable (300) length adjustment.

An alternative embodiment of the top frame member (210) has one or more eyelets (450) molded as an integral part of the top frame member (210) or one or more eyelets (450) are affixed by eyelet (450) affixing means to the top frame member (210). An alternative to interconnection between a suspension means (600) and the frame (200) is by use of cable means (300) comprised of chain (300) which is received through each of the one or more eyelets (450) with a clip hook (410), as seen in FIG. 8, at a chain end (310) which clips into a link of the chain (300) intermediate the frame (200) and the suspension means (600). An alternative where the cable means (300) is comprised of a belting means (300) is the use of a belting buckle (415), as seen in FIG. 8.

Suspension means (600) in the preferred embodiment, seen in FIG. 1, comprises a suspension frame (610) which is generally elongated and planar and generally will be constructed of a semi-rigid material including wood, plastic and other construction materials including, for example, 1"×2" wood stock. Suspension hook means (620), comprised of eye hooks (620) or other hook means recognized as the equivalent by those of ordinary skills in the hook arts. Such suspension hook means (620) will receive hoop means (500) as the interconnection of the cable means (300) and suspension hook means (620). It will be recognized that other equivalent devices and means will be available for such hanging function. In the preferred embodiment a suspension mounting means (630) will be employed which will include screws means (630) through the suspension frame (610) to a structure such as facie board or the ceiling. A suspension centering guide (640) is formed in the suspension frame (610), in the preferred embodiment, by forming a "V" in the suspension frame (610) which will assist the consumer of the invention in installing the invention. The centering guide (640) will receive a hook means (650) which is employed to suspend the bird feeder. The centering guide (640) thus insures the desired spacing between the suspension hook means (620) and the bird feeder.

Figure 9:
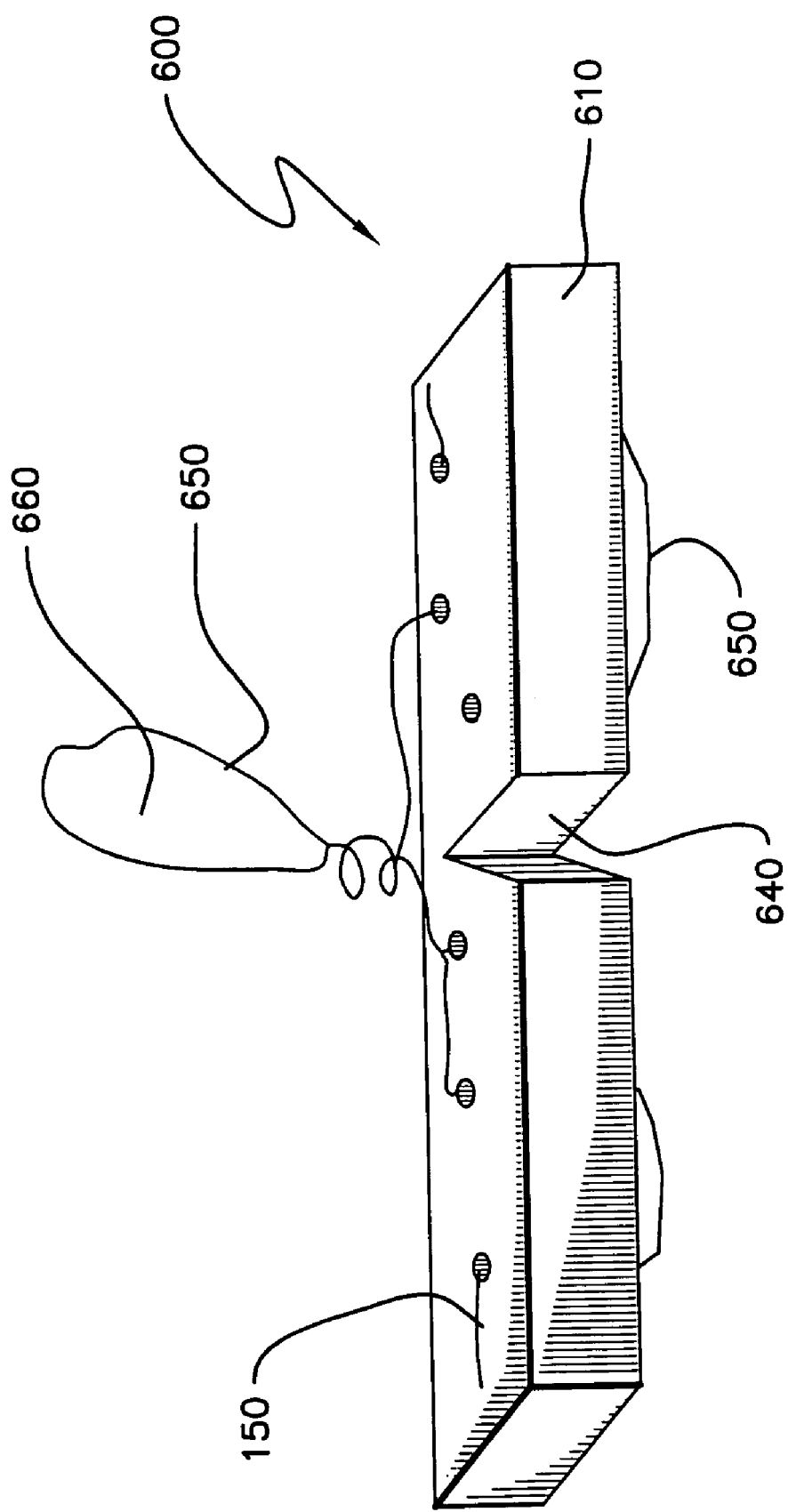
FIG. 9 is shows an alternative suspension means (600) configuration.

An alternative suspension frame (610), shown in FIG. 9, is pre-drilled to receive a suspension wire (650) which is affixed by bending means to the suspension frame (610) and formed to provide a suspension aperture (660) capable of receiving a branch or some other protruding structure at a patio or porch.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:
1. A bird seed collector comprising:
   a. a frame system (100) comprising a two part frame (200) having securing and supporting means to secure and support a reservoir (800); the reservoir (800) comprised in part of a bag (810); the frame (200) securing and supporting means permits the removal of the bag (810) from the frame;
   b. the frame (200) and the (bag) are suspended from a suspension means (600), beneath a bird feeder, by cable, hook and hoop means (300, 400, 500);
   c. the bag (810) having a bag top (840) and a bag bottom (830); opening and closing means (850) at the bag bottom (830);
   d. a bag opening (820) at the bag top (840) receives bird feed scattered from the bird feeder;
   e. the two part frame (200) having a top frame member (210) and a bottom frame member (250);
   f. the top frame member having a downward directed wedge means (230) comprised of a top frame wedge means (230); the bottom frame member (250) has a wedge receiving means (260) which is sized and shaped to receive the wedge means (230).

2. A bird seed collector of claim 1 further comprising:
a. the top frame wedge means (230) is comprised of a downward directed wedge means (230); the wedge receiving means (260) is comprised generally of a grooves shaped and sized to receive the wedge means (230).

3. A bird seed collector of claim 2 further comprising:
a. the top frame wedge means (230) is comprised of a downward directed protrusion including, "V" or "U" wedge shaped downward directed protrusions which are received into a wedge or other shape protrusion wedge receiving means (260) shaped and sized to receive the top frame wedge means (230);
b. the bag (810), proximal the bag top (840) and proximal a bag top perimeter (845), is placed between the indicated top frame member (210) and the bottom fame member (250); the bag top (840) and the bag (810), being composed of pliable or flexible material, will be depressed, by the top fame wedge (230), into the bottom frame wedge receiving means (260) effecting a friction securing means between the bag (810) and the two part frame (200).

4. A bird seed collector of claim 3 further comprising:
a. the bag bottom closing means (850) includes zipper, Velcro®, and similar closing means;
b. the bag top (840) is distal to the bag bottom (830); the a bag top (840) at the bag top opening (820) comprises the bag top perimeter (845); the two part frame (200) receives the bag top (840) such that the bag top perimeter (845) is fully grasped between the top frame member (210) and the bottom frame member (250); the bag bottom opening (820) is closed or secured by the bag bottom closing means (850) when the invention is in use to collect bird seeds; when the closing means (850) is released or opened, the bag bottom opening (835) is revealed;
c. suspension means (600) is comprised of a suspension frame (610), which is generally elongated and planar and generally will be constructed of a semi-rigid material including wood, plastic and other construction materials including 1"×2" wood stock; suspension hook means (620), comprised of eye hooks (620) or other hook means will receive hoop means (500) as the interconnection of the cable, hook and hoop means (300, 400, 500) with the frame (200); hook means (400) affixed by cable affixing means to the cable means (300) where the hook means (400) received and supports the frame (200); hoop means (500) affixed by cable affixing means to the cable means (300) where the hoop means (500) is received by suspension hook means (620);
d. suspension mounting means (630) will be employed which will include screws means (630) through the suspension frame (610) to a structure such as facie board or a ceiling;
e. a suspension centering guide (640) is formed in the suspension frame (610) and is centered in the suspension frame (610); the centering guide (610) is formed by forming a "V" in the suspension frame (610) which will assist the consumer of the invention in centering the suspension frame relative to the bird feeder, the centering guide (640) will receive a hook means (650) which is employed to suspend the bird feeder; the centering guide (640) insures the desired spacing between the suspension hook means (620) and the bird feeder.

5. A bird seed collector of claim 4 further comprising:
a. a bag annulus (832) is intermediate the bat top (840) and the bag bottom (830) such that the bag (810) narrows from the bag top (840) to the bag annulus (832) and the bag (810) generally enlarges from the bag annulus to the bag bottom (830).

6. A bird seed collector of claim 5 further comprising:
a. the bag annulus (832) is has a annulus diameter of 3"; the bag (810) at the bag bottom (830) is approximately 10" in diameter or the bag bottom closing means (850) will measure approximately 10".

7. A bird seed collector of claim 6 further comprising:
a. the bag (810) interconnected, at the bag bottom (830) with a bottle (860) with a threaded PVC joint (865);
b. the threaded PVC joint (865) having a threaded interconnection with the bottle (860) and offering a joint (865) opening which receives the bag (810) at the bag bottom (830) for interconnection between bag bottom (830) and joint (865) generally by interconnection means (870).

8. A bird seed collector of claim 7 further comprising:
a. interconnection means (870) comprised of glue means (870) such as hot glue.

9. A bird seed collector of claim 6 further comprising:
a. the bag annulus (832) is has a annulus diameter of 3"; the bag (810) at the bag bottom (830) is approximately 10" in diameter or the bag bottom closing means (850) will measure approximately 10".

10. A bird seed collector of claim 9 further comprising:
a. the bag (810) interconnected, at the bag bottom (830) with a bottle (860) with a threaded PVC joint (865);
b. the threaded PVC joint (865) having a threaded interconnection with the bottle (860) and offering a joint (865) opening which receives the bag (810) at the bag bottom (830) for interconnection between bag bottom (830) and joint (865) generally by interconnection means (870).

11. A bird seed collector of claim 10 further comprising:
a. interconnection means (870) comprised of glue means (870) such as hot glue.

12. A bird seed collector of claim 3 further comprising:
a. the two part frame (200) additionally secures the bag (810) with the frame (200) via a clamping means provided by the top frame first clamp means (215) and the top frame second claim means (217);
b. each of the top frame first clamp means (215) and the top frame second claim means (217) extend outward from the top frame wedge means (230); the top frame first clamp means (215) has a top frame clamp means first end (220) which is distal from the top frame wedge means (230) and which forms a clamping means generally cup or hook shaped toward the top frame wedge means (230); the top frame second clamp means (217) has a top frame clamp means second end (222) which is distal from the top frame wedge means (230) and which forms a clamping means generally cup or hook shaped toward the top frame wedge means (230);
c. the top frame first clamp means (215) and the top frame second clamp means (217) are formed from spring or elastic means materials such as plastics and some metals; the spring component is such that the top frame clamp means first end (220) and the top frame clamp means second end (222) may be urged out and up or bowed out and up from the top frame wedge means (230) and, when forced downward against the bottom frame member (250) and released, the spring function will urge the receipt respectively by a bottom frame first clamp means (255) and bottom frame second clamp means (257);

d. the bag (810) composed of cloth, vinyl and or plastics.

13. A bird seed collector of claim 12 further comprising:

a. a female to male interconnection between the top frame first clamp means (215) and the top frame second clamp means (217) with the bottom frame first clamp means (255) and bottom frame second clamp means (257) comprising securing means of the bag (810) between the top frame member (210) and the bottom frame member (250) via both friction and clamping forces;

b. the bag bottom closing means (850) includes zipper, Velcro®, and similar closing means;

c. the bag top (840) is distal to the bag bottom (830); the a bag top (840) at the bag top opening (820) comprises the bag top perimeter (845); the two part frame (200) receives the bag top (840) such that the bag top perimeter (845) is fully grasped between the top frame member (210) and the bottom fame member (250); the bag bottom opening (820) is closed or secured by the bag bottom closing means (850) when the invention is in use to collect bird seeds; when the closing means (850) is released or opened, the bag bottom opening (835) is revealed;

d. suspension means (600) is comprised of a suspension frame (610), which is generally elongated and planar and generally will be constructed of a semi-rigid material including wood, plastic and other construction materials including 1"×2" wood stock; suspension hook means (620), comprised of eye hooks (620) or other hook means will receive hoop means (500) as the interconnection of the cable, hook and hoop means (300, 400, 500) with the frame (200); hook means (400) affixed by cable affixing means to the cable means (300) where the hook means (400) receives and supports the frame (200); hoop means (500) affixed by cable affixing means to the cable means (300) where the hoop means (500) is received by suspension hook means (620);

e. suspension mounting means (630) will be employed which will include screws means (630) through the suspension frame (610) to a structure such as facie board or a ceiling;

f. a suspension centering guide (640) is formed in the suspension frame (610) and is centered in the suspension frame (610); the centering guide (610) is formed by forming a "V" in the suspension frame (610) which will assist the consumer of the invention in centering the suspension frame relative to the bird feeder; the centering guide (640) will receive a hook means (650) which is employed to suspend the bird feeder; the centering guide (640) insures the desired spacing between the suspension hook means (620) and the bird feeder.

14. A bird seed collector of claim 13 further comprising:

a. the bag (810) interconnected, at the bag bottom (830) with a bottle (860) with a threaded PVC joint (865);

b. the threaded PVC joint (865) having a threaded interconnection with the bottle (860) and offering a joint (865) opening which receives the bag (810) at the bag bottom (830) for interconnection between bag bottom (830) and joint (865) generally by interconnection means (870).

15. A bird seed collector of claim 14 further comprising:

a. interconnection means (870) comprised of glue means (870) including hot glue.

16. A bird seed collector of claim 13 further comprising:

a. a bag annulus (832) is intermediate the bag top (840) and the bag bottom (830) such that the bag (810) narrows from the bag top (840) to the bag annulus (832) and the bag (810) generally enlarges from the bag annulus to the bag bottom (830).

17. A bird seed collector of claim 16 further comprising:

a. the bag annulus (832) is has a annulus diameter of 3"; the bag (810) at the bag bottom (830) is approximately 10" in diameter or the bag bottom closing means (850) will measure approximately 10".

18. A bird seed collector of claim 17 further comprising:

a. the suspension frame (610) is pre-drilled to receive a suspension wire (650) which is affixed by bending means to the suspension frame (610) and formed to provide a suspension aperture (660) capable of receiving a branch or some other protruding structure;

b. the top frame member (210) has one or more eyelets (450) affixed by eyelet (450) affixing means to the top frame member (210).

19. A bird seed collector of claim 18 further comprising:

a. cable means (300) comprised of chain (300) which is received through each of the one or more eyelets (450) with a clip hook (410) at a chain end (310) which clips into a link of the chain (300) intermediate the frame (200) and the suspension means (600) or cable means (300) is comprised of a belting means (300) with a belting buckle (415) at a belting means end (310) which secures the belting means (300) intermediate the frame (200) and the suspension means (600).

20. A bird seed collector of claim 19 further comprising:

a. cable means (300) comprised of chain (300) which is received through each of the one or more eyelets (450) with a clip hook (410) at a chain end (310) which clips into a link of the chain (300) intermediate the frame (200) and the suspension means (600) or cable means (300) is comprised of a belting means (300) with a belting buckle (415) at a belting means end (310) which secures the belting means (300) intermediate the frame (200) and the suspension means (600).

* * * * *